United States Patent [19]

Wah Lo et al.

[11] 4,086,585
[45] Apr. 25, 1978

[54] SYSTEM AND CAMERA FOR CONTROLLING DEPTH OF FIELD IN THREE-DIMENSIONAL PHOTOGRAPHY

[75] Inventors: Allen Kwok Wah Lo; Jerry Curtis Nims, both of Dunwoody, Ga.

[73] Assignee: Dimensional Development Corporation, Atlanta, Ga.

[21] Appl. No.: 754,739

[22] Filed: Dec. 27, 1976

[51] Int. Cl.$^2$ ............................................. G03B 35/08
[52] U.S. Cl. ...................................... 354/115; 353/7; 354/114; 355/22
[58] Field of Search ............... 354/114, 115, 112, 110, 354/116, 293, 294; 352/60, 61; 353/7; 96/40; 355/22

[56] References Cited

U.S. PATENT DOCUMENTS

| | | | |
|---|---|---|---|
| 3,508,920 | 4/1970 | Glenn, Jr. .................................. 96/40 |
| 3,800,307 | 3/1974 | Wechsler ............................. 354/112 |
| 3,953,869 | 4/1976 | Wah Lo et al. ...................... 354/115 |
| 3,960,563 | 6/1976 | Wah Lo et al. .................. 354/114 X |

FOREIGN PATENT DOCUMENTS 1,113,502  3/1956  France.

OTHER PUBLICATIONS

"Applied Optics and Optical Engineering", Rudolf Kingslake, Academic Press, N.Y. N.Y., (1965) pp. 108-116.
"Stereoscopy", Valyres, 1962, pp. 202-205.
"Optimum Design and Depth Resolution of Lens-Sheet & Projection Type Displays", Okoshi, Applied Optics, vol. 10, No. 10, 1971.

*Primary Examiner*—Edna M. O'Connor
*Attorney, Agent, or Firm*—Brumbaugh, Graves, Donohue & Raymond

[57] ABSTRACT

In the exemplary embodiments of the invention disclosed, a system especially adapted for producing stereoscopic pictures in general photography includes a camera having a plurality of lenses aligned in a row with the optical axes substantially in parallel and the endmost lenses spaced apart by a distance that is productive of a three-dimensional depth of field in the system which matches or exceeds the two-dimensional depth of field of the camera lenses at least under average photographic conditions. Such matching of the two and three-dimensional depths of field, where the limits of the two-dimensional depth of field are based on the lenticule width $w$ of the stereoscopic picture, provide sharply focused, solid stereoscopic images of all objects within the two-dimensional capabilities of the camera lens.

9 Claims, 2 Drawing Figures

SYSTEM AND CAMERA FOR CONTROLLING DEPTH OF FIELD IN THREE-DIMENSIONAL PHOTOGRAPHY

BACKGROUND OF THE INVENTION

1. Field of the Invention

The present invention relates in general to stereoscopic photography, and in particular to a novel stereoscopic system and camera which are especially adapted for use by the general photographer.

2. The Prior Art

In the production of lenticular-type stereoscopic photographs by the indirect technique, in which a plurality of two-dimensional views of a scene or object field are taken from a number of horizontally spaced vantage points and combined beneath a lenticular screen to form a composite three-dimensional view of the field, it is important for optimum image quality in the stereoscopic picture that both the two-dimensional and the three-dimensional images be sharply focused. Accordingly, the depth of field provided by the camera used to photograph the object field must be appropriate from the point of view of both two-dimensional photography and three-dimensional photography. The proper depth of field for two-dimensional purposes is of course dependent on the permissible size of the circle of confusion, and, as described in our prior U.S. Pat. No. 3,960,563, the proper three-dimensional depth of field is dependent on the permissible parallax value in the stereoscopic picture between images of the objects at the nearest foreground plane and the farthest background plane. Heretofore, the two-dimensional depth of field and the three-dimensional depth of field have been independently controlled, as, for example, by adjusting the f-number of the camera lens, in the case of two-dimensional photography, and by varying the spacing between photographic vantage points (camera or camera lens locations) or by rearranging the various objects in the scene, in the case of the three-dimensional photography. There has been, however, no provision, short of such independent adjustment, for controlling the two-dimensional and three-dimensional depths of field such that the requirements of both are simultaneously met or for permitting the requirements of both to be readily satisfied in situations where neither the photographic vantage points nor the objects can be moved. This is particularly true in general photography where, for purposes of economy and ease of use, it is desirable to fix the camera lenses in place in the camera housing and to avoid the need for the photographer to rearrange the scene. Moreover, it is quite often the case that locations of some, if not all, of the objects of the scenes typically photographed in general usage are beyond the photographer's control.

SUMMARY OF THE INVENTION

It is therefore an object of the present invention to provide an indirect lenticular-type system for producing high quality, sharply focused stereoscopic photographs and a camera useful in such system.

It is a further object of the invention to provide such a system and camera which are productive of high quality, sharply focused photographs over a wide range of depths of object fields.

Another object of the invention is to provide such a system and camera which have particular application to general photography, by virtue of providing a camera construction which is at once economical to produce, easy to use and productive of sharp, in focus images over a broad range of photographic conditions.

The foregoing and other objectives of the invention are met by the provision of a system, and a camera useful in such system, for producing stereoscopic pictures by means of the indirect lenticular technique in which the camera employed to photograph the object field includes a plurality of lenses aligned in a straight path with their optical axes substantially parallel and the endmost ones of which are spaced apart by a distance such that the maximum parallax value or effect created in the stereoscopic picture is properly controlled as a function of the lenticular width $w$ of the stereoscopic picture, whereby all objects within the limits of the two-dimensional depth of field of the camera lenses will be sharply focused and of solid appearance in the stereoscopic picture. That is to say, the overall camera lens spacing is selected, in accordance with the invention, such that the three-dimensional depth of field provided by such spacing will be equal to or larger than the corresponding two-dimensional depth of field of the camera lenses. The two-dimensional views of the object field taken by such camera are projected, from a corresponding number of projection locations, on to the lenticular screen with the projected image from each view of a selected object in registry with a reference point. A photosensitive surface, preferably in the form of an emulsion coated on the base of the lenticular screen, is thereby exposed to provide the stereoscopic picture.

In a preferred embodiment particularly adapted for general photography, the camera lens spacing is determined by the quantity $cF(N-1)/f$, where $c$ is within the range of substantially 1.0 to substantially 5.0 where the lenticular width $w$ is greater than 5 mils and is within the range of from substantially 1.0 to substantially 10.0 where $w$ is 5 mils or less, F is the effective focal length of the camera lenses, and $f$ is a selected $f$-number of the lenses. The selected $f$-number may be the highest $f$-number provided by the lenses or higher, or it may be an $f$-number, such as $f/10$ or $f/11$, which provides a two-dimensional depth of field suitable for general photography under typical photographic conditions. When the camera lens spacing is selected using the highest $f$-number or an appropriately high $f$-number, such as $f/10$, the three-dimensional depth of field, i.e., the range of distances from the camera over which objects located in the object field will appear sharply focused and solid in the stereoscopic picture, will at least match the two-dimensional depth of field of the lenses at such high selected $f$-number, thereby permitting full use to be made of the two-dimensional depth of field capabilities of the camera. Lower $f$-numbers may thereafter be used, as conditions require, without exceeding the three-dimensional depth of field characteristics of the camera.

In accordance with the invention, appropriate values of $c$ for use in determining the camera lens spacing are 10.0 where the lenticular width $w$ in the stereoscopic picture is 5 mils or less, and 5.0 where the lenticular width $w$ is greater than 5 mils. The minimum preferred value of $c$ is 1.0. Also, an appropriate $f$-number for the purpose of the present invention, i.e., for general photography, is approximately $f/10$. In a system and camera constructed in accordance with the invention and especially adapted for use by the amateur photographer, therefore, the preferred range of camera lens spacings is from $F(N-1)/10$ to $F(N-1)$ where the lenticular width $w$ in the stereoscopic picture is 5 mils or less, and from $F(N-1)/10$ to $F(N-1)/2$ where the lenticular width $w$ is greater than 5 mils.

BRIEF DESCRIPTION OF THE DRAWINGS

For a better understanding of the invention, reference may be made to the following description of exemplary embodiments thereof, taken in conjunction with the figures of the accompanying drawings, in which.

DETAILED DESCRIPTION

Figure 1:
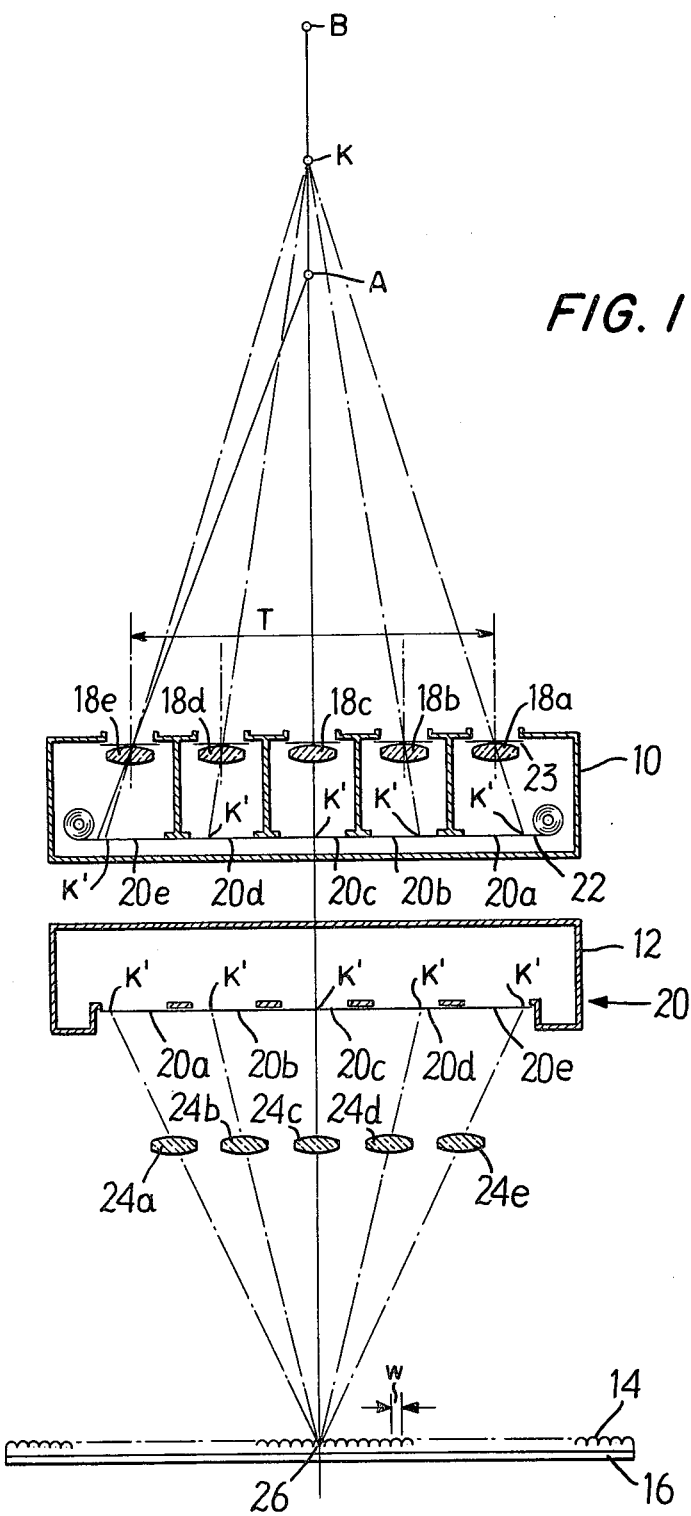
FIG. 1 is a schematic view of a system for producing stereoscopic pictures in accordance with the invention and a camera for use in such system.

FIG. 1 illustrates the basic components of the indirect process of lenticular stereoscopic photography as embodied in the system of the present invention. As there shown, the system includes a camera 10, a composer or enlarger 12, and a lenticular screen 14 overlying a photosensitive layer 16. The camera 10 includes a plurality N of lenses 18a – 18e aligned in a common plane and in a straight path, with their optical axes arranged in parallel and the endmost two, 18a and 18e, of which are spaced apart by a distance T. Although, for purposes of illustration, five equally spaced lenses (N=5) are depicted in FIG. 1, it will be understood that a different number or spacing of lenses may be employed if desired. For general photography, the number of lenses N is preferably between 3 and 6. Higher N values could of course be used, but this is unattractive from an economic standpoint, since camera, film and processing costs increase correspondingly. It will also be understood that the simple objective lenses depicted are illustrative only, and that composite lens systems would normally be employed.

The camera 10 is provided with a film advance mechanism (not shown) of any suitable construction for advancing a like number N of unexposed film frames 20a – 20e into registry with the lenses 18a – 18e. Preferably, the film frames are carried on a continuous film strip 22. Camera 10 is further provided with a suitable shutter system, indicated schematically at 23 in FIG. 1, which may for example be of the blade type described in our prior U.S. Pat. No. 3,852,787. Alternatively, individual shutters, preferably electronically controlled, may be provided. Whatever its specific form, the shutter system may be arranged to make all N exposures simultaneously or, as described in U.S. Pat. No. 3,852,787, to allow selective operation of the several lenses.

Upon exposure, the lenses 18a – 18e produce on the associated film frames 20a – 20e latent images of the objects, such as those indicated at A, K and B for example, located in the object field to be photographed. For clarity, only the image K' produced by the central light rays from the object K are shown in FIG. 1. Thereafter, the film strip 22 may be advanced for another series of N pictures. Following exposure of the entire film strip, it is developed in conventional fashion and the film frames 20a – 20e bearing the developed images K' are placed in the composer 12 in alignment with a corresponding number N of projecting lenses 24a – 24e for projection of the images K' in registry with a reference point 26. With the images K' so registered, the object K will appear to lie in the plane of the stereoscopic picture, while the object A will appear to project from the picture and the object B will appear to recede into the picture. The projecting lenses 24a – 24e may be independently adjustable for control of magnification and for registry of the projected K' images with reference point 26.

The exposed photosensitive layer 16 is then developed to provide a composite stereoscopic view of the object field. The layer 16 may comprise a separate film sheet which, after exposure and development, is bonded or otherwise affixed to the base of the lenticular screen 14. Preferably, however, layer 16 is composed of a photosensitive emulsion coated on the rear surface of the screen. Such a composite screen-emulsion unit is known in the art as lenticular print film.

To achieve optimum image quality in stereoscopic pictures produced by use of the system of FIG. 1, the images of the various objects within the object field, when viewed through the lenticular screen 14, should appear sharply focused and solid, i.e., images should not appear blurred or interrupted. Blurred, out-of-focus images result if the two-dimensional depth of field of the camera lenses 18a – 18e is too small for the particular object field at hand, and interrupted images result where the three-dimensional depth of field of the system is too small. Consequently, both the two-dimensional depth of field and the three-dimensional depth of field provided by the system and the camera 10 must be appropriate for the object field to be photographed and, in accordance with the invention, are preferably matched such that the three-dimensional depth of field will be at least as large as the two-dimensional depth of field of the camera lenses for most if not all of the $f$-numbers of the lenses 18a – 18e.

Figure 2:
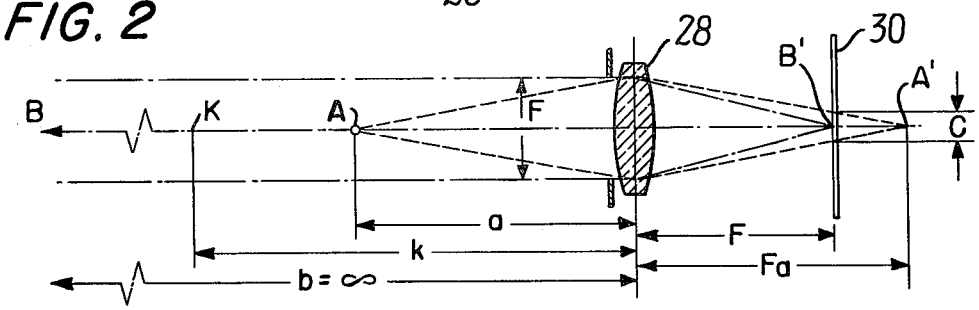
FIG. 2 is a diagrammatic view of a single objective lens illustrating certain basic relationships between the objects of a photographic scene and the images of those objects formed by the objective.

For greater flexibility of use in general photography, both the two-dimensional depth of field and the three-dimensional depth of field provided by the camera should be comparatively deep, thereby allowing the camera to be used for a wide variety of field arrangements while still providing sharply focused, solid images in the stereoscopic picture. Referring now to FIG. 2, the far limit $b$ of the two-dimensional depth of field therefore is preferably set at infinity. Then, if it is assumed that the objective lens 28, which is representative of the lenses 18a – 18e in camera 10, is focused at infinity, the near limit $a$ of the two-dimensional depth of field may be determined in accordance with $$a = (F_aF/F_a-F) \qquad (1)$$

where, as shown in FIG. 2:

$a$ is the near limit of the two-dimensional depth of field;

$b$ is the far limit of the two-dimensional depth of field;

$F$ is the effective focal length of the lens 28; and $F_a$ is the distance from the objective plane to the image plane for a point A located at the near limit of the two-dimensional depth of field.

As will be apparent from FIG. 2, however, the distance $F_a$ is dependent on the permissible size of the circle of confusion, designated C. Hence, the near limit $a$ of the two-dimensional depth of field will be that distance at which the size of the image point A' at the film plane 30 equals the maximum value of the permissible circle of confusion C.

In accordance with the present invention, the maximum permissible value of C is $w/R$, where $w$ is the width of an individual lenticule on the lenticular screen 14 and R is the enlargement ratio provided by the composer 12. In lenticular type stereoscopic photography, the lenticule width w of the stereoscopic picture is preferably selected so as to be substantially imperceptible to the eye at the average viewing distance for the type of picture with which it is used. That is to say, the smaller the picture, and thus the shorter the viewing distance, the smaller the lenticule width w, and vice versa. For example, for snapshots and like hand-held photographs, to which the present invention has particular application, the lenticule width w preferably should be on the order of 5 mils or less. This is based on an average viewing distance for a snapshot of about 10 inches, at which distance an object begins to become perceptible to the human eye at about 5 mils diameter. It will be appreciated, therefore, that the lenticule width w may be used as the basis for the permissible circle of confusion C in the two-dimensional images, since so long as the diameter of a projected light cone (from a point on a foreground object image or a background object image) falling on the lenticular screen 14 does not exceed the lenticule width w in size, it will be imperceptible to the eye. This assumes that w has been selected in accordance with the foregoing practice in the lenticular-type stereoscopic photography, i.e., so as itself to be at or under the limit of perceptibility at the average viewing distance. Of course, since the stereoscopic picture is an enlargement, the permissible value of C for the two-dimensional negatives is w/R.

Returning again to FIG. 2 and equating C to w/R, it may be seen that:

$$F_a = \frac{F^2}{f\left[\frac{F}{f} - \frac{W}{R}\right]} \quad (2)$$

where:

$f$ is the $f$-number of the lens 28;

$w$ is the lenticule width of the lenticular screen 14; and

R is the enlargement ratio between the two-dimensional film frames and the stereoscopic picture.

As described in U.S. Pat. No. 3,960,563, the pertinent portions of which are hereby incorporated by reference, the near and far limits of the three-dimensional depth of field are dependent upon the maximum permissible parallax value or effect between the key subject matter object, illustrated at K in FIG. 1, which appears in the plane of the stereoscopic picture and either the nearest foreground object, illustrated at A in FIG. 1, or the farthest background object, illustrated at B in FIG. 1, in the object field. As there described, the spacing T between the optical axes of the endmost camera lenses 18a and 18e is related to the permissible total parallax value occurring at such endmost lenses in accordance with:

$$T = \frac{cw(N-1)ak}{FR(k-a)} \text{ or } \frac{cw(N-1)kb}{FR(b-k)} \quad (3)$$

where:

c is the number of lenticules by which the image on the stereoscopic picture of either the foreground object or the image of the background object, whichever is greater, shifts relative to the key subject matter image between adjacent lens locations;

k is the distance from the objective plane to the key subject matter object K;

N is the number of lenses;

a is the near limit of the three-dimensional depth of field; and b is the far limit of the three-dimensional depth of field.

The term $cw(N-1)$ in equation (3) defines the parallax value $(X_{KA''})$ between the image of the nearest foreground object A and the image of the key subject matter object K or the parallax value $(X_{BK''})$ between the image of the key subject matter object K and the image of the farthest background object B, as formed on the stereoscopic picture from the film frames 20a and 20e associated with the respective endmost lenses 18a and 18e. As described in U.S. Pat. No. 3,960,563, the value of c is selected according to photographic conditions, the lenticule width w employed in the lenticular screen, etc., and is normally between 1.0 and 5.0 for lenticules larger than 5 mils and between 1.0 and 10.0 for lenticules of 5 mils or smaller. These limits on the value of c thus define the maximum permissible range of the parallax value. So long as the parallax values $X_{KA''}$ and $X_{KB''}$ are each maintained within the permissible range, all objects in the object field at or beyond the location a of the nearest foreground object A and at or closer than the location b of the farthest background object B will appear sharply focused and solid in the stereoscopic picture, assuming of course that objects so located are also located within the two-dimensional depth of field of the lenses 18a – 18e.

As previously noted, in general photography the locations of the various objects in the object field are often beyond the control of the photographer. Also, for economy of construction and ease of use of the camera by the photographer, the camera lenses are preferably fixed in place in the camera housing and are of a fixed focal length. The photographer likewise does not have control of the value of c and w in equation (3), nor does he have control of the magnitude of the enlargement ratio R. Accordingly, it is important that a fixed-lens camera intended for general use have a lens spacing T which will maintain the parallax values $X_{KA''}$ and $X_{KB''}$ within the permissible range for a wide variety of photographic conditions.

In accordance with the invention, therefore, the near and far limits of the two-dimensional depth of field represented by equations (1) and (2) are employed to determine the appropriate lens spacing T. For a far limit b of infinity and a near limit a as provided by equations (1) and (2), equation (3) reduces to $$T = [cF(N-1)/f] \quad (4)$$

from which it may be seen that the lens spacing T is determined as a function of the permissible shift c in the foreground or background image between vantage points of adjacent camera lenses and as a function of the relative aperture of the camera lens.

In employing equation (4) to determine the value of T for a general use camera, the value of c should be selected at the maximum permissible value of 5.0 or 10.0, according to whether the lenticule width w of the stereoscopic picture is greater or less than 5 mils as described above.

If the camera does not include provision for adjusting the aperture stop of the lenses, the $f$-number of the lenses, whatever it may be, or a higher $f$-number is used in equation (4) to determine T. A typical $f$-number for a single fixed-focus camera, for example might be on the order of $f/14$ to $f/10$.

Generally, with a fixed aperture camera the actual $f$-number of the lenses will be used, since this will match the two-dimensional and three-dimensional depths of field. Use of a higher $f$-number in equation (4) than the actual $f$-number has the advantage of producing a greater three-dimensional depth of field, but results in a smaller spacing T and thus reduces the stereoscopic effect.

If the aperture stop of the lenses is adjustable, then either the highest $f$-number setting provided by the lenses or, preferably, the highest $f$-number suitable for average general photographic conditions, may be used in equation (4). For instance, under average lighting and object field conditions, an $f$-number of $f/10$ is appropriate. An $f$-number of $f/10$ is also well suited for the purpose of the present invention in that it will provide a comparatively deep two-dimensional depth of field and, by virtue of the matching of the two-dimensional and three-dimensional depths of field inherent in equation (4), will provide a camera lens spacing T productive of a comparatively deep three-dimensional depth of field. It will be understood that the use of $f/10$ or any other $f$-number in determining the camera spacing lens T is done at the time that the camera is designed, and the photographer is in no way limited to the use of such $f$-number in actual use of the camera unless of course the camera has a fixed aperture stop. In use, the $f$-number may be set at a higher or lower value than the design $f$-number, higher $f$-numbers providing greater two-dimensional depths of field and lower $f$-numbers providing smaller two-dimensional depths of field. If a lower $f$-number is used, however, the effect on the depth of field should be taken into account by the photographer in selecting or planning the object field to be photographed.

With the preferred $f$-number of $f/10$, the preferred range of camera lens spacings T for a camera intended for use in general photography would be from $F(N-1)/10$ to $F(N-1)/2$, where $w$ is greater than the 5 mils, and from $F(N-1)/10$ to $F(N-1)$, where $w$ is 5 mils or less.

In certain circumstances, of course, it will not be necessary or desirable, for artistic or other reasons, that all objects in the scene be sharply focused, as, for example, where there are large background objects such as mountains, buildings and the like and the principal objects of interest are located much closer to the photographer than the background objects. In such cases, only the objects which are to be in focus need be located within the limits $a$ and $b$.

Although the invention has been described herein with reference to specific embodiments thereof, many modifications and variations of such embodiments may be made by those skilled in the art without departing from the inventive concepts disclosed. Accordingly, all such modifications and variations are intended to be included within the breadth and scope of the appended claims.

We claim:

1. A system for producing stereoscopic pictures in general photography, comprising:

a camera for recording a plurality N of two-dimensional views of an object field, said camera including a corresponding plurality N of lenses aligned in a straight path with their optical axes substantially in parallel and the spacing between the optical axes of the two endmost lenses being within the range determined by $cF(N-1)/f$;

means for projecting respective ones of the two-dimensional views from a corresponding plurality N of aligned, spaced projecting lens locations, with the projected image from each two-dimensional view of a selected object in the object field in substantial registry with a predetermined reference point;

a lenticular screen of lenticule width $w$ positioned opposite said projecting lens locations; and a photosensitive surface positioned adjacent the rear surface of said lenticular screen, where $c$ is within the range of from substantially 1.0 to substantially 5.0 where $w$ is greater than 5 mils and is within the range of from substantially 1.0 to substantially 10.0 where $w$ is 5 mils or less, $f$ is an $f$-number at least as high as the highest $f$-number provided by the lenses, and F is the effective focal length of the lenses.

2. The system of claim 1 wherein said photosensitive surface comprises a photosensitive emulsion layer coated on the rear surface of said lenticular screen.

3. A system for producing stereoscopic pictures in general photography, comprising:

a camera for recording a plurality N of two-dimensional views of an object field, said camera including a corresponding plurality N of lenses having a maximum $f$-number of at least $f/10$ aligned in a straight path with their optical axes substantially in parallel and the spacing between the optical axes of the two endmost lenses being within the range of from substantially $F(N-1)/10$ to substantially $F(N-1)/2$, where F is the effective focal length of the lenses;

means for projecting respective ones of the two-dimensional views from a corresponding plurality N of aligned, spaced projecting lens locations, with the projected image from each two-dimensional view of a selected object in the object field in substantial registry with a predetermined reference point;

a lenticular screen positioned opposite said projecting lens locations; and a photosensitive surface positioned adjacent the rear surface of said lenticular screen.

4. The system of claim 3 wherein said photosensitive surface comprises a photosensitive emulsion layer coated on the rear surface of said lenticular screen.

5. The system of claim 4 wherein said photosensitive surface comprises a photosensitive emulsion coated on the rear surface of said lenticular screen.

6. A system for producing stereoscopic pictures in general photography, comprising:

a camera for recording a plurality N of two-dimensional views of an object field, said camera including a corresponding plurality N of lenses having a maximum $f$-number of at least $f/10$ aligned in a straight path with their optical axes substantially in parallel and the spacing between the optical axes of the two endmost lenses being within the range of from substantially $F(N-1)/10$ to substantially $F(N-1)$, where F is the effective focal length of the lenses;

means for projecting respective ones of the two-dimensional views from a corresponding plurality N of aligned, spaced projecting lens locations, with the projected image from each two-dimensional view of a selected object in the object field in substantial registry with a predetermined reference point;

a lenticular screen of lenticule width $w$ of the order of 5 mils or less positioned opposite said projecting lens locations; and a photosensitive surface positioned adjacent the rear surface of said lenticular screen.

7. In a general use camera for taking a plurality N of two-dimensional views of an object field for use in composing a stereoscopic picture of the type incorporating a lenticular screen of lenticule width $w$, the camera including a corrresponding plurality N of lenses aligned in a straight path with their optical axes spaced apart and substantially in parallel and film support means for positioning unexposed film in image-recording relation to said lenses, wherein the spacing between the optical axes of the two endmost lenses is within the range determined by $cF(N-1)f$, where $c$ is within the range of from substantially 1.0 to substantially 5.0 where $w$ is greater than 5 mils and is within the range of from substantially 1.0 to substantially 10.0 where $w$ is 5 mils or less, F is the effective focal length of the lenses, and $f$ is an $f$-number at least as high as the highest $f$-number provided by the lenses.

8. In a general use camera for taking a plurality N of two-dimensional views of an object field for use in composing a stereoscopic picture of the type incorporating a lenticular screen, the camera including a corresponding plurality N of lenses aligned in a straight path with their optical axes spaced apart and substantially in parallel and film support means for positioning unexposed film in image-recording relation to said lenses, wherein:

the lenses have a maximum $f$-number of at least $f/10$; and the spacing between the optical axes of the two endmost lenses is within the range of from substantially $F(N-1)/10$ to $F(N-1)/2$, where F is the effective focal length of the lenses.

9. In a general use camera for taking a plurality N of two-dimensional views of an object field for use in composing a stereoscopic picture of the type incorporating a lenticular screen having a lenticule width $w$ of the order of 5 mils or less, the camera including a corresponding plurality N of lenses aligned in a straight path with their optical axes spaced apart and substantially in parallel and film support means for positioning unexposed film in image-recording relation to said lenses, wherein:

the lenses have a maximum $f$-number of at least $f/10$; and the spacing between the optical axes of the two endmost lenses is within the range of from substantially $F(N-1)/10$ to substantially $F(N-1)$, where F is the effective focal length of the lenses.

* * * * *

UNITED STATES PATENT OFFICE
CERTIFICATE OF CORRECTION

Patent No. 4,086,585                    Dated April 25, 1978

Inventor(s) Allen Kwok Wah Lo and Jerry Curtis Nims

It is certified that error appears in the above-identified patent and that said Letters Patent are hereby corrected as shown below:

Col. 3, line 2, "/2where" should read --/2 where--;
Col. 5, line 35, that part of the equation reading "$\frac{W}{R}$" should read --$\frac{W}{R}$--;
Col. 7, line 2, after "example" insert a comma;
Col. 9, line 14, "corrresponding" should read --corresponding--;
Col. 9, line 21, "cF(N-1)$f$" should read --cF(N-1)/$f$--.

Signed and Sealed this

Fifth Day of September 1978

[SEAL]

Attest:

RUTH C. MASON
Attesting Officer

DONALD W. BANNER
Commissioner of Patents and Trademarks